United States Patent
Yu et al.

(10) Patent No.: US 10,693,960 B2
(45) Date of Patent: Jun. 23, 2020

(54) DATA EXCHANGE GUIDE DEVICE AND AN EXECUTION METHOD THEREOF

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

(*) Notice: Subject to any disclaimer, the term of this patent is extended or adjusted under 35 U.S.C. 154(b) by 234 days.

(21) Appl. No.: 15/825,143

(22) Filed: Nov. 29, 2017

(65) Prior Publication Data

US 2019/0116224 A1    Apr. 18, 2019

(30) Foreign Application Priority Data

Oct. 18, 2017   (TW) .............................. 106135659 A

(51) Int. Cl.
| | | |
|---|---|---|
| *H04L 29/06* | (2006.01) | |
| *H04L 29/08* | (2006.01) | |
| *G06F 13/38* | (2006.01) | |
| *G06F 3/06* | (2006.01) | |
| *H04L 9/30* | (2006.01) | |

(Continued)

(52) U.S. Cl.
CPC ........ *H04L 67/1095* (2013.01); *G06F 3/0658* (2013.01); *G06F 3/147* (2013.01); *G06F 13/385* (2013.01); *G06F 21/6218* (2013.01); *G06F 21/85* (2013.01); *H04L 9/0825* (2013.01); *H04L 9/0897* (2013.01); *H04L 9/30* (2013.01); *H04L 63/0442* (2013.01); *H04L 63/0853* (2013.01)

(58) Field of Classification Search
CPC ...... G06F 21/62; G06F 21/6218; G06F 21/34; H04L 9/30; H04L 63/0442; H04L 63/0853
See application file for complete search history.

(56) References Cited

U.S. PATENT DOCUMENTS 7,047,416 B2 * 5/2006 Wheeler ................ G06Q 20/00
                                                   380/282
7,971,062 B1 * 6/2011 Hughes ................. H04L 9/0897
                                                   380/278

(Continued)

OTHER PUBLICATIONS

Menezes et al., Handbook of Applied Cryptography, CRC Press, 1996, pp. 419-420 (Year: 1996).*

*Primary Examiner* — Khang Do
(74) *Attorney, Agent, or Firm* — Bacon & Thomas, PLLC

(57) ABSTRACT

A data exchange guide device and an execution method thereof provided in the present disclosure are characterized that a processing program, which is executed by an electronic device connected with a connection interface, is able to read private key information, access a tabulation of remote shared data from an existing network available to the electronic device, and display the tabulation on a graphic user interface. Furthermore, a data exchange guide device and an execution method thereof provided in the present disclosure are also characterized that a processing program, which is executed by an electronic device connected with the connection interface and a virtual network card, is able to read private key information, access a tabulation of remote shared data from the virtual network card, and display the tabulation on a graphic user interface.

6 Claims, 7 Drawing Sheets

(51) Int. Cl.
*G06F 21/62* (2013.01)
*H04L 9/08* (2006.01)
*G06F 3/147* (2006.01)
*G06F 21/85* (2013.01)

(56) References Cited

U.S. PATENT DOCUMENTS

| | | | |
|---|---|---|---|
| 9,331,990 B2* | 5/2016 | Le Saint | G06Q 20/38215 |
| 9,723,351 B2* | 8/2017 | Keidar | H04N 5/50 |
| 2004/0250087 A1* | 12/2004 | Ray | G06F 21/602 |
| | | | 713/189 |
| 2007/0226215 A1* | 9/2007 | Tamaki | G06Q 30/06 |
| 2007/0234404 A1* | 10/2007 | Bogdanovic | G06F 21/34 |
| | | | 726/3 |
| 2007/0256126 A1* | 11/2007 | Erickson | G06F 21/34 |
| | | | 726/20 |
| 2010/0185843 A1* | 7/2010 | Olarig | G06F 21/6218 |
| | | | 713/2 |
| 2011/0113235 A1* | 5/2011 | Erickson | G06F 21/34 |
| | | | 713/152 |
| 2014/0122871 A1* | 5/2014 | Yu | G06F 21/6218 |
| | | | 713/156 |
| 2015/0134852 A1* | 5/2015 | Yu | G06F 21/725 |
| | | | 709/245 |
| 2016/0182455 A1* | 6/2016 | Harrison | H04L 63/0272 |
| | | | 726/15 |
| 2017/0118196 A1* | 4/2017 | Ponsini | H04L 63/0823 |
| 2017/0366529 A1* | 12/2017 | McNeely | H04L 63/0272 |
| 2019/0057567 A1* | 2/2019 | Underhill | H04L 9/3226 |

\* cited by examiner

DATA EXCHANGE GUIDE DEVICE AND AN EXECUTION METHOD THEREOF

BACKGROUND OF THE INVENTION

1) Field of the Invention

The present disclosure relates to a data exchange device and an execution method thereof, particularly the device in which a specific program for guiding a communicative connection is stored and the method featuring integrated software and hardware for authentication as well as a virtual network card that differ from a conventional technique.

2) Description of the Prior Art

In recent years, individual electronic equipment popular with the general public makes users, who are unfamiliar with knowledge of cyber security mostly, develop the habit of relying on all types of user-friendly electronic devices in which various personal information and/or messages are left precariously but disregard individual privacy.

To store all kind of information in electronic equipment safely, the authentication methods as major mechanisms of ensuring personal privacy, for example, username/password, one-time password, and physical authentication key, have been available; additionally, the pairing methods as minor mechanisms of ensuring access to an electronic device by another user but preventing electronic equipment from any unauthorized user's invasion can be Wi-Fi protecting configurations, Bluetooth pairing, etc.

There have been several patents for data sharing or authentication as shown below.

TW I564729 disclosed "system and method for data sharing", which comprises a media server, a first device and a second device. The media server has a media server address by which a plurality of media files are saved; the first device relies on the media server address to download a media file from the media server and play back the media file through a multimedia player. The first device further depends on a switching signal to output file information corresponding to the media file. The second device receives the media information from the first device, streams the media file from the media server according to the file information, and refers to the file information to play back the media file through the multimedia player.

TW I552001 disclosed "connection information sharing system, computer program, and connection information sharing method thereof. The connection information sharing system is available to a mesh network environment in which at least a controlled device exists. The connection information sharing method comprises following steps: execute a transmission process in which connection information is integrated for receiving integrated information; create a connection code according to the integrated information; execute a reception process in which a connection code is identified; restore the integrated information from the connection code; create a connection by the integrated information and at least a controlled device.

TW I494789 disclosed "a safe data sharing system and an executing method thereof" for data sharing on the Internet and the local-area network (LAN) wherein a safe data sharing system comprises at least a digital key and a digital box. When the USB connector of the digital key is connected to a USB port on a terminal device, a certification program is executed by the terminal device, which depends on a network unit of the digital box to access a data storage device after the data storage device correctly matched is checked by a connection unit of the terminal device through the network unit of the digital box and a decoding program.

TW I590069 disclosed "a data-encrypted/decrypted sharing mechanism applied in a cloud computing environment and a method for authority management". In this technique for encryption of high-sensitive data based on an encrypted key, an encrypted key is re-encrypted by an enterprise employee using the RSA TOKEN and further by a recovery key which is managed by a hierarchical data control server; an encrypted file in a cloud storage mechanism is saved in cloud for not only data security but also hierarchical data access and encrypted data sharing through the hierarchical data control server.

However, a general solution which is still subject to software along with an encrypted key for verification of data exchange does nothing about replicability of the encrypted key.

To solve the above problem, the applicant provides a data exchange guide device and an execution method thereof hereinafter.

SUMMARY OF THE INVENTION

In virtue of the above problem, a data exchange guide device and an execution method thereof provided in the present disclosure are to ensure security by means of specific hardware electrically connected and software installed for verification.

Accordingly, a data exchange guide device and an execution method thereof in the present disclosure are to make sure of security and convenient communications effect simultaneously.

A data exchange guide device and an execution method thereof in the present disclosure prevent an encrypted key from being reproduced easily.

A data exchange guide device and an execution method thereof in the present disclosure make use of a virtual network card to ensure credibility of packet transmission.

A data exchange guide device and an execution method thereof in the present disclosure feature a specific software interface for consistent user experience.

To this end, the present application adopts the following technical measures. A data exchange guide device in the present disclosure comprises a connection interface and a storage module, both of which are electrically connected to each other through a substrate; the storage module comprises private key information and a processing program; a data exchange guide device is characterized that the processing program, which is executed by an electronic device connected with the connection interface, is able to read the private key information, access a tabulation of remote shared data from an existing network available to the electronic device, and display the tabulation on a graphic user interface.

A data exchange guide device is further embodied according to the following technical measure.

In the data exchange guide device, the connection interface is a universal serial bus interface.

The data exchange guide device further comprises a controller which is electrically connected to the substrate.

Moreover, a data exchange guide device is further embodied according to the other technical measure as follows. A data exchange guide device comprises a connection interface, a storage module and a network module, all of which are electrically connected to one another through a substrate; the storage module comprises private key information and a processing program; a data exchange guide device is characterized that the processing program, which is executed by an electronic device connected with the connection interface and a virtual network card of the network module, is able to read the private key information, access a tabulation of remote shared data from the virtual network card, and display the tabulation on a graphic user interface.

A data exchange guide device is further embodied according to the following technical measures.

In the data exchange guide device, the connection interface is a universal serial bus interface.

The data exchange guide device comprises a controller which is electrically connected to the substrate.

In the data exchange guide device, the storage module comprises a driver.

In the data exchange guide device, the virtual network card is a virtual network card which accesses an existing network available to the electronic device for an encrypted connection.

In the data exchange guide device, the network module comprises an external network interface which is electrically connected to the substrate.

Moreover, an execution method of the data exchange guide device is embodied according to the following technical measures. An execution method of the data exchange guide device is a method of guiding data exchanges, which comprises: Step 1: a connection interface is electrically connected to an electronic device for execution of a processing program; Step 2: private key information is read by the processing program; Step 3: a tabulation of remote shared data is accessed from an existing network available to the electronic device by the processing program; Step 4: the tabulation is displayed on a graphic user interface by the processing program.

In the execution method of the data exchange guide device, an external network interface is electrically connected to an external network after Step 1.

In the execution method of the data exchange guide device, a driver of the storage module is guided to installing in the electronic device after Step 1.

In the execution method of the data exchange guide device, the electronic device is connected to a virtual network card before Step 2.

In the execution method of the data exchange guide device, the existing network available to the electronic device is the network accessed by the virtual network card in Step 3.

In contrast to conventional techniques, a data exchange guide device and an execution method thereof are effective in: (1) security is promoted with hardware electrically connected; (2) compatibility is better due to availability of a universal interface; (3) the risk prevention of network security is available in virtue of data exchanges based on a virtual network card.

BRIEF DESCRIPTIONS OF THE DRAWINGS

DETAILED DESCRIPTIONS OF THE PREFERRED EMBODIMENTS

Figure 1:
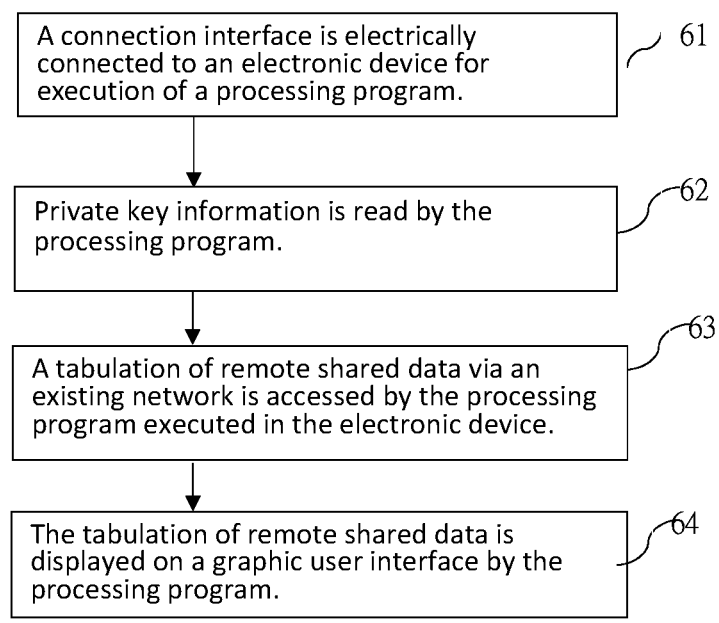
FIG. 1 is the first flowchart for a data exchange guide device and an execution method thereof in a preferred embodiment.
Figure 5:
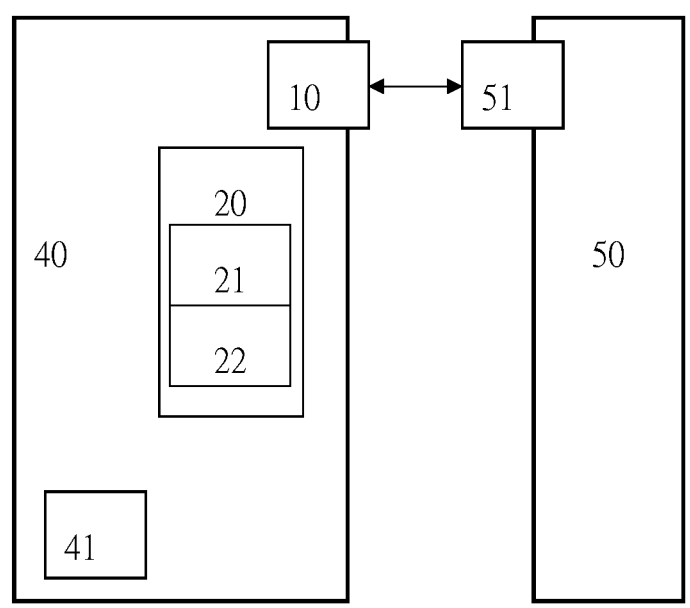
FIG. 5 is the first schematic view of a data exchange guide device in a preferred embodiment.

A data exchange guide device and an execution method thereof are further illustrated in preferred embodiments for clear understanding of purposes, characteristics and effects:

FIGS. 1 and 5 illustrate a data exchange guide device and an execution method thereof in the present disclosure in the first embodiment; as shown in FIG. 5, a data exchange guide device comprises a connection interface (10) and a storage module (20).

In a data exchange guide device, the connection interface (10) can be a Universal Serial Bus interface; the Universal Serial Bus (USB) interface, which is a serial bus criterion for connection between a computer system and an external device and also a technical specification for an I/O interface, is applicable to PCs and communications products such as mobile devices widely; in general, the USB port on a computer device (mobile device) is the USB Type A and/or C port (Micro USB Type A and/or C port) mostly.

Moreover, the storage module (20) consists of non-volatile memories from which saved data, in case of power outage, is not erased but accessed after power restoration; the storage module (20) and the connection interface (10) are electrically connected to each other through a substrate (40); the substrate (40) is a printed circuit board that is an important electronic assembly unit on which electronic components are mounted and circuits of the electronic components are interconnected; in addition, a data exchange guide device comprises a controller (41) which is electrically connected to the substrate (40); the controller (41) is a processor such as a micro processor (µP) which is a specific programmable IC.

Moreover, the storage module (20) comprises private key information (21) and a processing program (22) wherein the private key information (21) is hidden data such that files are irreproducible; the private key information (21) means an encrypted private key based on the public-key cryptography through which two keys, a public key and a private key, are demanded; the public key (the private key) is available to encrypting (decrypting) a plaintext (ciphertext) or decrypting (encrypting) a ciphertext (plaintext). A cryptograph which has been encrypted with a key must be decrypted with the other corresponding key for a readable plaintext. A key which is correlated with the other corresponding key mathematically and available supposedly cannot be taken as a basis to estimate the corresponding key. Accordingly, a key which is the so-called public key is available to other users; the other one as the private key not available to other users must be in the custody of an owner strictly and not divulged to anybody or the counterparty to be communicated through any channel. In a data exchange guide device, the processing program (22), which is a program executed in memories and even a resident program in system memories after execution, is executed for displaying something on a main interface; the processing program (22) functions as a tool to read the private key information (21), access a tabulation of remote shared data from an existing network, and display the tabulation on a graphic user interface.

As a corresponding device linking a data exchange guide device in the present disclosure, an electronic device (50) is a platform on which an operational program's source codes are executed, for example, a computer or a smart device in general. Because the connection interface (10) which is a universal serial bus interface is to be electrically connected, the electronic device (50) should be provided with a corresponding male/female connector.

First, referring to FIG. 1, which illustrates Step 1 (61): a connection interface (10) is electrically connected to an electronic device (50), as shown in FIG. 5, for execution of the processing program (22).

Specifically, the connection interface (10) with a USB male connector is connected to a USB interface (51) through which a data exchange guide device is electrically connected to an electronic device (50) for execution of the processing program (22) manually or automatically.

Then, as shown in Step 2 (62) in FIG. 1 and FIG. 5, the private key information (21) is read by the processing program (22).

In detail, the processing program (22) is executed in the electronic device (50) such that the private key information (21) in the storage module (20) is accessed through the connection interface (10) and the interface (51), both of which are electrically connected to each other.

Next, as shown in Step 3 (63) in FIG. 1 and FIG. 5, a tabulation of remote shared data via an existing network is accessed by the processing program (22) executed in the electronic device (50).

In practice, the Internet is available to the electronic device (50) in the embodiment via an existing network and a tabulation of remote shared data is accessed through the electronic device (50) linking remote equipment for identity authentication and encrypted data communications by the private key information (21).

Finally, as shown in Step 4 (64) in FIG. 1 and FIG. 5, a tabulation of remote shared data is displayed on a graphic user interface by the processing program (22).

In practice, the information in a tabulation of remote shared data accessed in Step 3 (63) is displayed on a graphic user interface by the processing program (22) for convenience of a user who is able to download data from or upload data to the graphic user interface.

Figure 2:
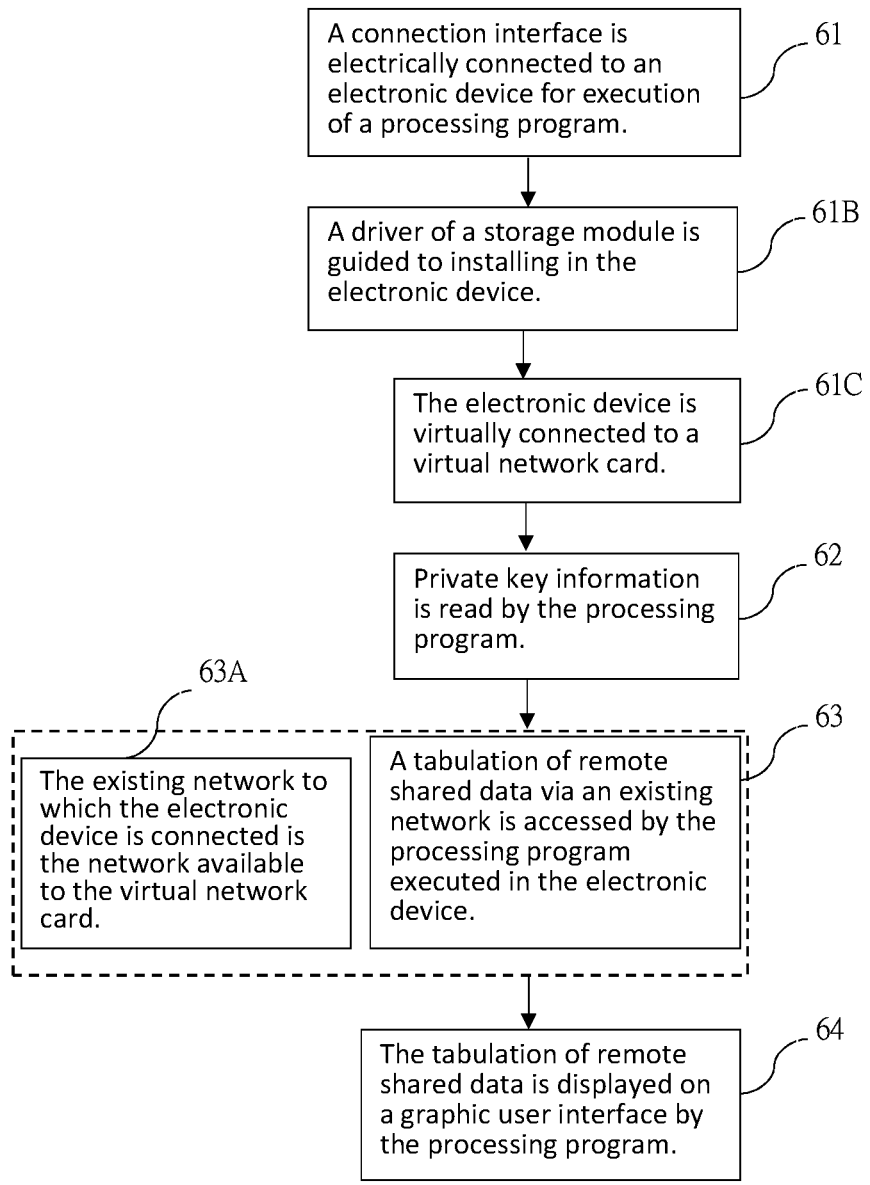
FIG. 2 is the second flowchart for a data exchange guide device and an execution method thereof in a preferred embodiment.
Figure 3:
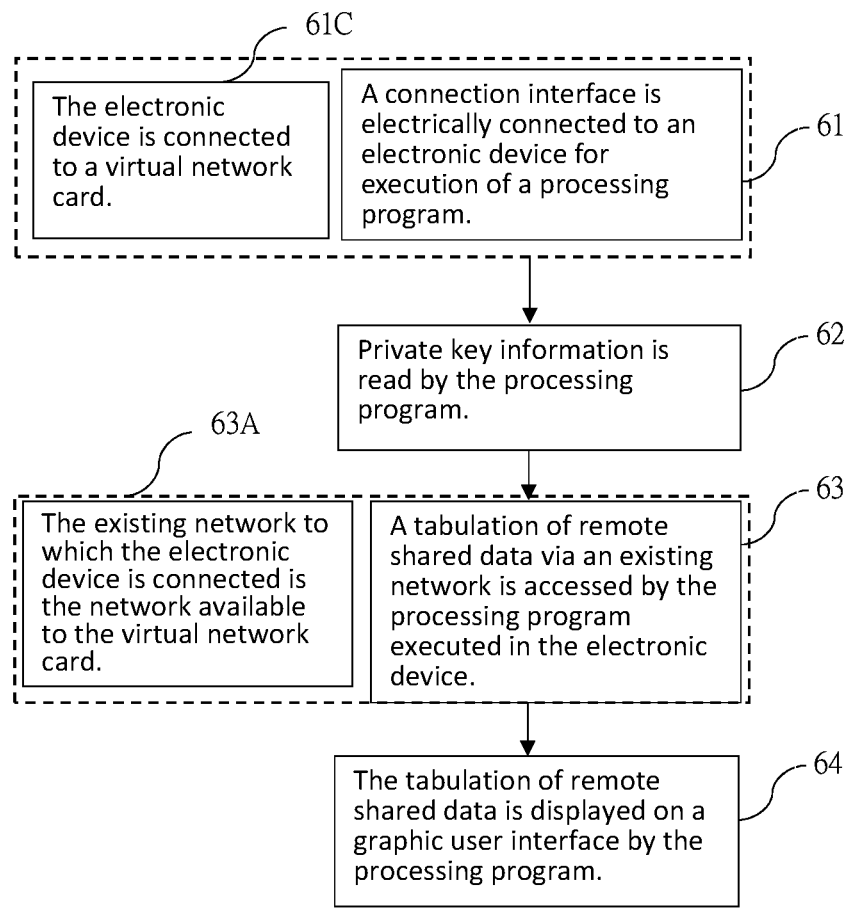
FIG. 3 is the third flowchart for a data exchange guide device and an execution method thereof in a preferred embodiment.
Figure 6:
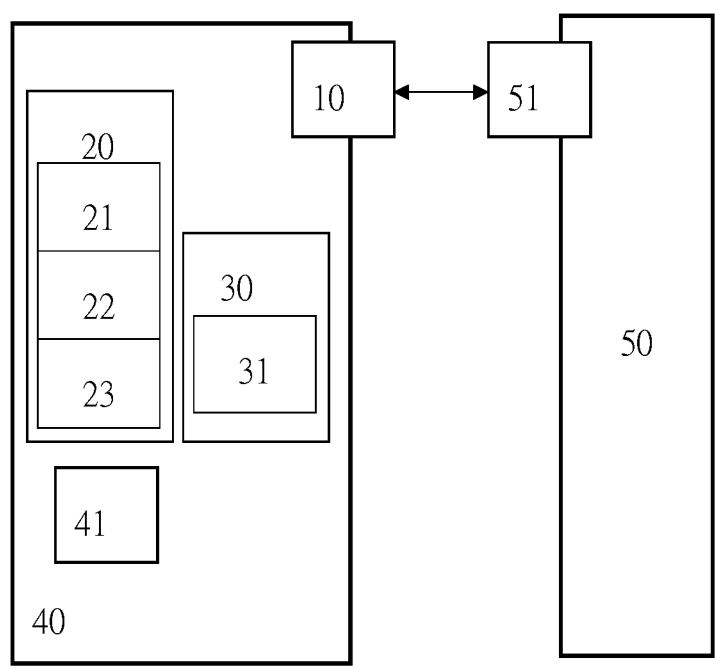
FIG. 6 is the second schematic view of a data exchange guide device in a preferred embodiment.

Referring to FIGS. 2, 3 and 6, which illustrate a data exchange guide device and an execution method thereof in the second embodiment in which the symbols identical to those of the first embodiment in FIGS. 1 and 5 are not explained hereinafter. The differences in the second embodiment differing from the first embodiment are Step 1B (61B) as well as Step 1C (61C) added between Step 1 (61) and Step 2 (62) in the first embodiment and further Step 3A (63A) added after Step 3 (63) in the first embodiment.

As shown in FIG. 6, a data exchange guide device in the present disclosure comprises a connection interface (10), a storage module (20) and a network module (30).

In the present disclosure, a data exchange guide device comprises the connection interface (10) and the storage module (20), both of which have been explained in the first embodiment, and further a driver (23) added for the storage module (20).

In a data exchange guide device, the driver (23) designed as a device driver is a program through which high-level computer software interacts with hardware, a communication interface between hardware and hardware or hardware and software is created, and data exchanges between hardware devices, for example, a mechanism of linking hardware devices via USB ports on a motherboard or communicating other subsystems, are probable. The driver (23) in the present disclosure is effective in enabling the electronic device (50) to access the network module (30).

Moreover, the network module (30) which is a subassembly with functions for linking a network integrated comprises a virtual network card (31) in the embodiment. The virtual network card (31), which is a network interface controller (NIC) and also computer hardware designed for communications among computers on a network, is incapable of accessing the Internet independently but bridged to an existing physical network card in the electronic device (50) in the embodiment for communicating with an external network through the physical network card accessing the Internet. According to the above features, a tabulation of remote shared data is accessed when the network is available to the processing program (22) via the virtual network card (31), which is connected with an existing physical network card in the electronic device (50) in Step 3 (63), instead of via the existing physical network card in the electronic device (50) directly for better safety and non-surveillance.

First, referring to FIG. 2, which illustrates Step 1 (61): a connection interface (10) is electrically connected to an electronic device (50), as shown in FIG. 6, for execution of the processing program (22).

Then, as shown in Step 1B (61B) in FIG. 2 and FIG. 6, a driver (23) of the storage module (20) is guided to installing in the electronic device (50).

Then, as shown in Step 1C (61C) in FIG. 2 and FIG. 6, the electronic device (50) is virtually connected to a virtual network card (31).

As shown in Step 1B (61B) and Step 1C (61C), the driver (23) enables the electronic device (50) to access the virtual network card (31) which is bridged to and relies on an existing physical network card in the electronic device (50) accessing the Internet for communication with an external network.

Next, as shown in Step 2 (62) in FIG. 2 and FIG. 6, the private key information (21) is read by the processing program (22).

As shown in Step 3 (63) in FIG. 2 and FIG. 6, a tabulation of remote shared data is accessed by the processing program (22) through the electronic device (50) which has been connected to an existing network; Step 3A (63A) illustrates the existing network to which the electronic device (50) is connected is the network available to the virtual network card (31).

Finally, as shown in Step 4 (64) in FIG. 2 and FIG. 6, a tabulation of remote shared data is displayed on a graphic user interface by the processing program (22).

In contrast to the second embodiment mentioned previously, FIG. 3 illustrates a flow chart with differences as follows: both Step 1 (61) and Step 1C (61C) are executed simultaneously without Step 1B (61B) during which the driver (23) is installed.

Figure 4:
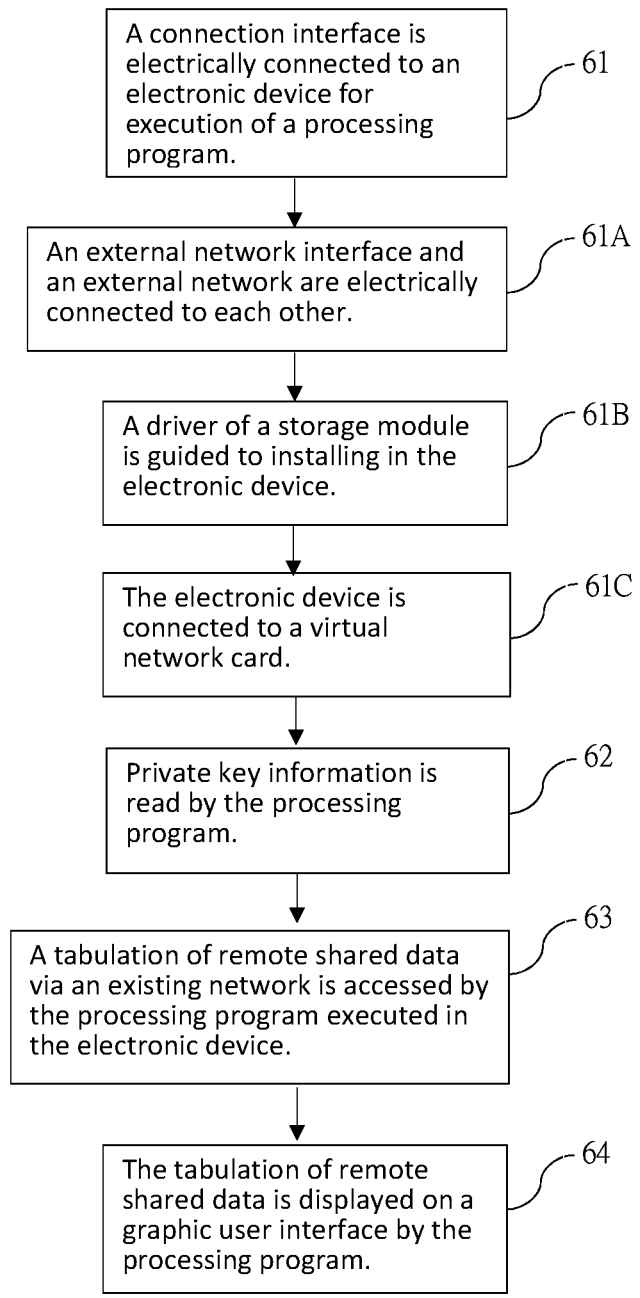
FIG. 4 is the fourth flowchart for a data exchange guide device and an execution method thereof in a preferred embodiment.
Figure 7:
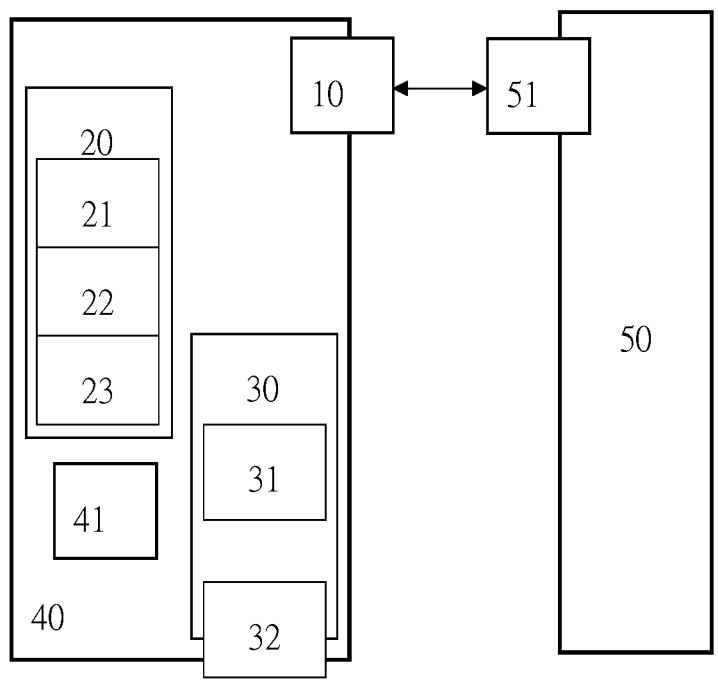
FIG. 7 is the third schematic view of a data exchange guide device in a preferred embodiment.

Referring to FIGS. 4 and 7, which illustrate a data exchange guide device and an execution method thereof in the third embodiment in which the symbols identical to those of the first and second embodiments in FIGS. 1, 2, 3, 5 and 6 are not explained hereinafter. The differences in the third embodiment differing from the second embodiment are Step 1A (61A) after Step 1 (61) but no Step 3A (63A) after Step 3 (63).

First, referring to FIG. 7, which illustrates an external network interface (32) is added in the network module (30)

and the external network interface (32) and the substrate (40) are electrically connected to each other.

In practice, the external network interface (32) through which a wired network or a wireless network is connected is capable of linking an external network.

As shown in Step 1 (61) of the flow chart in FIG. 4, a connection interface (10) is electrically connected to an electronic device (50), as shown in FIG. 7, for execution of the processing program (22).

Referring to Step 1A (61A) in FIG. 4 and FIG. 7, an external network interface (32) and an external network are electrically connected to each other.

Specifically, the virtual network card (31), which depends on the external network interface (32) to communicate with an external network through a wired or wireless mechanism in Step 1A (61A), is able to access the Internet.

Then, as shown in Step 1B (61B) in FIG. 4 and FIG. 7, a driver (23) of the storage module (20) is guided to installing in the electronic device (50).

Next, as shown in Step 1C (61C) in FIG. 4 and FIG. 7, the electronic device (50) is virtually connected to a virtual network card (31).

Furthermore, as shown in Step 2 (62) in FIG. 4 and FIG. 7, the private key information (21) is read by the processing program (22).

As shown in Step 3 (63) in FIG. 4 and FIG. 7, a tabulation of remote shared data on an existing network is accessed by the processing program (22) through the electronic device (50).

Finally, as shown in Step 4 (64) in FIG. 4 and FIG. 7, a tabulation of remote shared data is displayed on a graphic user interface by the processing program (22).

Accordingly, a data exchange guide device and an execution method thereof which differ from a conventional data exchange device and an execution method thereof are referred to as creative work in the data exchange technique meets patentability and is applied for the patent It should be reiterated that the above descriptions present the preferred embodiment, and any equivalent change in specifications, claims or drawings still belongs to the technical field within the present disclosure with reference to claims hereinafter.

What is claimed is:

1. A data exchange guide device, comprising a connection interface, a storage module and a network module; wherein: the connection interface, the storage module and the network module are electrically connected one another through a substrate; the storage module comprises private key information, a processing program and a driver, wherein the driver is effective to enabling an electronic device to access the network module and wherein the network module contains a virtual network card which is incapable of accessing the Internet independently and needs to bridge to an existing physical network card in the electronic device;
wherein the processing program, which is executed by the electronic device connected with the connection interface and the virtual network card of the network module, is able to read the private key information, to access a tabulation of remote shared data when a network is available to the processing program via the virtual network card, which is connected with an existing physical network card in the electronic device, and to display the tabulation on a graphic user interface.

2. The data exchange guide device as claimed in claim 1 wherein the connection interface is a universal serial bus interface.

3. The data exchange guide device as claimed in claim 1, further comprising a controller which is electrically connected to the substrate.

4. The data exchange guide device as claimed in claim 1 wherein the network module comprises an external network interface which is electrically connected to the substrate.

5. An execution method of an data exchange guide device comprising a connection interface, a storage module and a network module; wherein the storage module comprises private key information, a processing program, and a driver, and the network module contains a virtual network card, the method comprising steps as follows:
step 1: the connection interface is electrically connected to an electronic device for execution of the processing program;
step 1b: the driver is installed in an electronic device;
step 1c: the driver enables the electronic device to access the virtual network card which is bridged to and relies on an existing physical network card in the electronic device to access the Internet for communication with an external network;
step 2: the private key information is read by the processing program;
step 3: a tabulation of remote shared data is accessed from an existing network available to the electronic device via the virtual network card by the processing program; and
step 4: the tabulation is displayed on a graphic user interface by the processing program.

6. The execution method of the data exchange guide device as claimed in claim 5 wherein an external network interface is electrically connected to an external network after Step 1.

* * * * *